United States Patent
Vegliante et al.

(10) Patent No.: US 7,991,641 B2
(45) Date of Patent: Aug. 2, 2011

(54) SYSTEMS AND METHODS FOR EVALUATING AND COMPENSATING EMPLOYEES BASED ON PERFORMANCE

(75) Inventors: Anthony J. Vegliante, Alexandria, VA (US); Susan M. LaChance, Gainesville, VA (US); B. Lynn Malcolm, Woodbridge, VA (US); Laurie A. Hayden, Arlington, VA (US); Robin L. McLarney, Centreville, VA (US)

(73) Assignee: United States Postal Service, Washington, DC (US)

( * ) Notice: Subject to any disclaimer, the term of this patent is extended or adjusted under 35 U.S.C. 154(b) by 750 days.

(21) Appl. No.: 11/638,404

(22) Filed: Dec. 14, 2006

(65) Prior Publication Data

US 2007/0244743 A1    Oct. 18, 2007

Related U.S. Application Data

(60) Provisional application No. 60/750,373, filed on Dec. 15, 2005.

(51) Int. Cl.
*G06F 17/00* (2006.01)
(52) U.S. Cl. .................................................. 705/11
(58) Field of Classification Search ............... 705/11
See application file for complete search history.

(56) References Cited

U.S. PATENT DOCUMENTS

| | | | |
|---|---|---|---|
| 6,119,097 A * | 9/2000 | Ibarra | 705/11 |
| 6,356,875 B1 * | 3/2002 | Green et al. | 705/9 |
| 6,853,975 B1 * | 2/2005 | Dirksen et al. | 705/11 |
| 7,565,268 B2 * | 7/2009 | Smith et al. | 702/182 |
| 2002/0019765 A1 * | 2/2002 | Mann et al. | 705/11 |
| 2003/0004790 A1 * | 1/2003 | Calderaro et al. | 705/11 |
| 2006/0020509 A1 * | 1/2006 | Strain et al. | 705/14 |
| 2006/0074743 A1 * | 4/2006 | Brown et al. | 705/11 |
| 2007/0038505 A1 * | 2/2007 | Barnes, IV et al. | 705/11 |
| 2007/0050238 A1 * | 3/2007 | Carr et al. | 705/11 |

OTHER PUBLICATIONS

Patton et al; Gainsharing in Zebulon: what do workers want?; Spring, 1998; Public Personnel Management, v27, n1, p. 117(15).*

* cited by examiner

*Primary Examiner* — Thomas Dixon
(74) *Attorney, Agent, or Firm* — Finnegan, Henderson, Farabow, Garrett & Dunner, LLP (57) ABSTRACT

Systems and methods are provided for evaluating and compensating employees based on performance. In one implementation, a computer-implemented method is provided. According to the method, objectives are received for an employee. The objectives are core requirements set as goals for an employee for a time period. Further, organization and unit indicators applicable to the employee's position are received from a database. Ratings are received from an evaluator for the core requirements and the organization indicators. The method further computes an overall rating that is a weighted average of the rated core requirements and the rated organization and unit indicators.

24 Claims, 5 Drawing Sheets

SYSTEMS AND METHODS FOR EVALUATING AND COMPENSATING EMPLOYEES BASED ON PERFORMANCE

RELATED APPLICATION

This application claims the benefit of priority from U.S. Provisional Application No. 60/750,373, entitled "Systems and Methods for Compensating Employees Based on Performance," filed Dec. 15, 2005, the disclosure of which is expressly incorporated herein by reference in its entirety.

BACKGROUND

1. Technical Field

The present invention relates to systems and methods for evaluating and compensating employees based on performance. In particular, systems and methods consistent with the present invention provide tools for establishing performance expectations, obtaining feedback on individual and organizational performance, linking individual contributions to organizational success, recognizing and rewarding performance at different levels, and ensuring accountability at all levels of an organization.

2. Background Information

Performance evaluation programs are frequently used by organizations, such as companies and government agencies, in order to evaluate employee performance and determine compensation for employees. A performance evaluation program may, for example, be used on an annual or semi-annual basis to evaluate an employee's performance and determine an employee's salary for an upcoming year. In a typical performance evaluation program, performance is measured based on establishing a goal for the evaluation time period. When an employee meets the goal, an incentive is awarded to the employee. The incentive may be a pay increase or a bonus, for example. As a result, once an employee has met the goal, he or she has no incentive to achieve a higher performance. In a similar fashion, an employee that is far from reaching the goal has no incentive to work toward a higher performance.

As can be readily observed, however, a performance evaluation program based on a single goal has significant drawbacks for both employees and organizations. In particular, employees are evaluated and compensation is based on whether they meet a goal or do not meet a goal, instead of individual contributions to the organization. Furthermore, the organization does not benefit from increased productivity and efficiency by employees that are far from reaching the goal, because such employees have no incentive to achieve a higher performance. The same applies to employees already achieving a goal. That is, those employees have no incentive to improve beyond the initial goal.

Systems and methods are needed that allow employees to concentrate on achievements within their control or influence and that are based on their "line-of-sight" in the organization. Furthermore, employees should know what is expected of them and how their actions impact the organization. The closer an employee is to a target, the more motivated he or she will be to achieve the target. In addition, employees who are far above or below a target should be provided with an incentive to continue improving because the organization will benefit from their efforts. Accordingly, there is a need for systems and methods of performance evaluation that encourage a higher performance at every level of an organization.

SUMMARY

Systems and methods consistent with the present invention provide tools for establishing performance expectations, obtaining feedback on individual and organizational performance, linking individual contributions to organizational success, recognizing and rewarding performance at different levels, and ensuring accountability at all levels of an organization. Employees may establish performance goals in conjunction with supervisors who may review employees' performance against agreed-upon targets at predetermined times during the year. Furthermore, systems and methods provide a means for recognizing and rewarding performance based upon an employee's performance.

Consistent with one aspect of the present invention, a method is provided for evaluating employee performance. The method may comprise receiving objectives for an employee. The objectives may comprise core requirements set as goals for an employee for a time period. The method may further comprise receiving, from a database, organization indicators applicable to the employee's position. Ratings may be received from an evaluator for the employee's performance against the targets set for core requirements and the organization indicators. An overall rating may be computed that is a weighted average of the rated core requirements and the rated organization indicators.

Consistent with another aspect of the present invention, a system is provided for evaluating employee performance. The system may comprise a server that is operable to receive objectives for an employee. The objectives may comprise core requirements set as goals for an employee for a time period. The server may further receive, from a database, organization indicators applicable to the employee's position. The server may receive ratings from an evaluator for the employee's performance against the targets set for core requirements and the organization indicators. The server may further compute an overall rating. The overall rating may be a weighted average of the rated core requirements and the rated organization indicators.

Consistent with yet another aspect of the present invention, a computer-readable medium is provided storing program instructions executable by a processor for evaluating employee performance according to the above-described method.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

DETAILED DESCRIPTION

Systems and methods consistent with the present invention provide computer-implemented tools for establishing performance expectations, obtaining feedback on individual and organizational performance, linking individual contributions to organizational success, recognizing and rewarding performance at different contribution levels, and ensuring accountability at all levels of an organization.

Consistent with the present invention, employees are evaluated on objective performance indicators and individual performance objectives. Objective performance indicators are established at organization (e.g., corporate) and unit levels. They may be aligned to strategies that improve customer service, generate revenue, manage costs, and enhance a performance-based culture. These indicators are established at the organization and unit levels and are tracked by the National Performance Assessment System.

Individual performance objectives, which may be considered core requirements, are established on the individual level and provide a mechanism for employees to identify their personal contributions to organization and unit success. Core requirements are established at the beginning of the year during an interactive discussion between an employee and evaluator and are tracked in a performance evaluation system (PES).

For example, consistent with the present invention, an organization may develop core requirements based on functions that are job-specific so that an employee can contribute in his or her own line of sight to help a unit of the organization reach established goals. In one embodiment, the PES prompts an employee to enter and maintain individual profile data (e.g., job title and reporting structure) and includes a mechanism for the evaluator to approve the employee's profile. Furthermore, the PES may provide functionality for an employee to enter goals for a specific fiscal year. PES may be linked to a data feed that updates employee information, such as occupation code or finance number changes.

Furthermore, systems and methods consistent with the present invention place emphasis on an organization's success through objective, measurable performance indicators. These performance indicators are measurable objectives aligned at the organization level, functional unit level, and individual level. Key elements include ensuring expectations are clearly stated; providing periodic feedback on actual performance compared to established targets; aligning objectives at the individual level through the unit and organizational structures; and recognizing individual successes that drive unit and organizational performance upward in a positive direction. National Performance Assessment (NPA) data may be used to update the PES at the end of each fiscal year rating period with organization and unit ratings. An employee's organization score, unit score, and individual core requirements rating may be used to arrive at the individual's overall performance rating for the fiscal year.

Consistent with the present invention, a heightened awareness of performance distinctions is also provided. An employee may concentrate on achievements within his or her control and based on his or her "line of sight" in the organization. This means the extent to which an employee can improve performance in certain levels of the organization will depend on the employee's position and influence within the organization. Furthermore, employees learn at the beginning of the evaluation period where priorities lie, what is expected of them, and how their individual results impact the organization. Accordingly, employees are provided clear performance expectations and regular feedback on individual and organizational performance. Individual contributions are linked to organizational success, performance is recognized and rewarded at different performance levels, and individuals are accountable at all levels of the organization.

Furthermore, employees are informed as to what is expected of them and how their individual actions impact the organization. The closer an employee's performance is to achieving a target, the more motivated he or she will be to stretch toward that target. Targets are set at multiple levels to provide an incentive for the employee to improve, no matter what their initial level of performance may be.

Mid-year performance reviews offer an on-going opportunity for feedback and recommendations for continuous improvement and are required elements of the program. An end-of-year performance evaluation review pulls together contributions to unit and organization performance indicators and individual core requirements. For both objective performance indicators and core requirements, a performance incentive is associated with achieving each level of performance: contributor, high contributor, and exceptional contributor.

Furthermore, a person known as an "evaluator" manages or has leadership responsibility over the performance of an eligible employee. This person is responsible for the direct day-to-day performance management of employees within a unit within the organization. An evaluator monitors the performance of employees, provides appropriate resources, and is responsible for coaching and feedback. An evaluator is accountable for the performance or nonperformance of the unit.

Reference will now be made in detail to the present embodiments of the invention, examples of which are illustrated in the accompanying drawings. Wherever possible, the same reference numbers will be used throughout the drawings to refer to the same or like parts.

Figure 1:
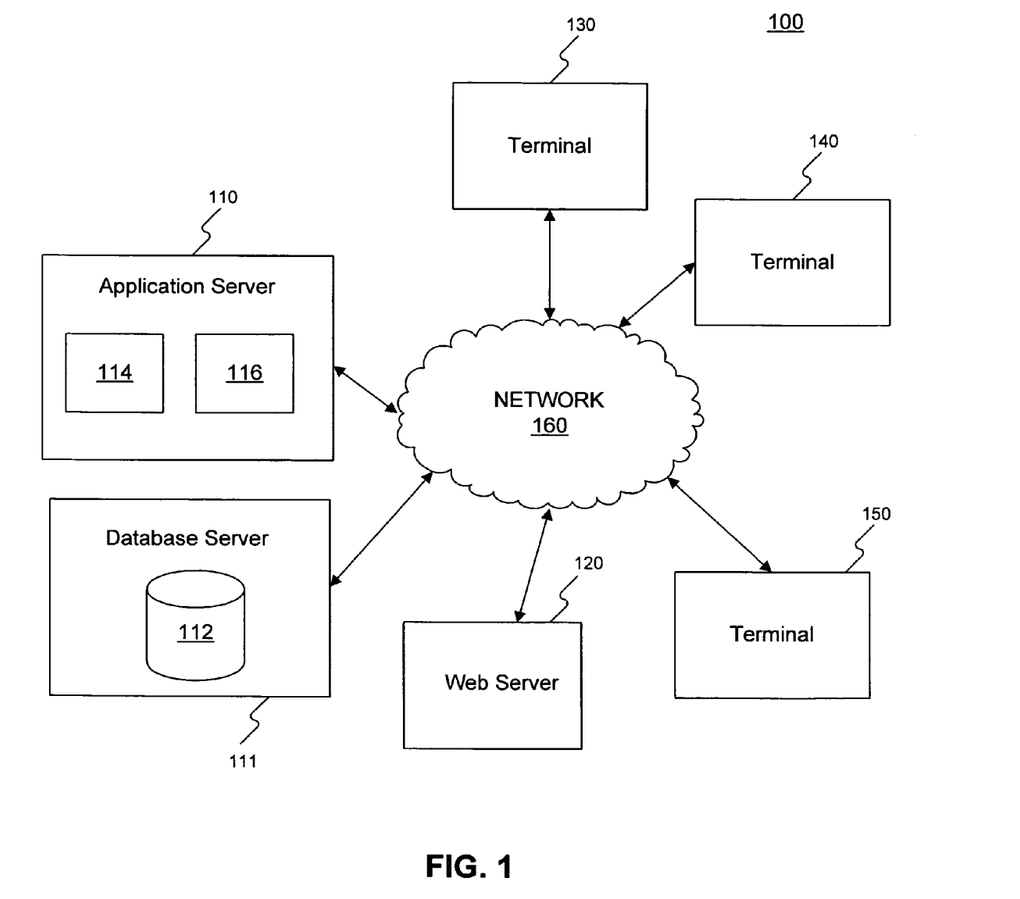
FIG. 1 is a exemplary system for evaluating and compensating employees based on performance, consistent with the present invention.

FIG. 1 is an exemplary system 100 for evaluating and compensating employees based on performance, consistent with the present invention. As shown in system 100, an application server 110, a database server 111, a web server 120, and terminals 130, 140, and 150 are connected to a network 160. One of skill in the art will appreciate that although three terminals are depicted in FIG. 1, any number of terminals may be provided. Furthermore, one of ordinary skill in the art will recognize that functions provided by one or more components of system 100 may be combined.

Network 160 provides communications between the various entities in system 100, such as application server 110, and terminals 130-150. In addition, application server 110, database server 112, web server 120, and terminals 130-150 may access legacy systems (not shown) via network 160, or may directly access legacy systems, databases, or other network applications, for example. Network 160 may be a shared, public, or private network, may encompass a wide area or local area, and may be implemented through any suitable combination of wired and/or wireless communication networks. Furthermore, network 160 may comprise a local area network (LAN), a wide area network (WAN), an intranet, or the Internet.

Application server 110 may comprise a general purpose computer (e.g., a personal computer, network computer, or mainframe computer) having a processor 114 and a memory 116. Processor 114 that may be selectively activated or reconfigured by a computer program. Application server 110 may also be implemented in a distributed network. Alternatively, application server 110 may be specially constructed for carrying-out methods consistent with the disclosed embodiment. Furthermore, memory 114 may store program modules that, when executed by processor 112, may provide functionality for an employee performance evaluation tool. Memory 114 may be one or more memory devices that store data as well as software. Memory 114 may also comprise on or more of RAM, ROM, magnetic storage, or optical storage, for example.

Database server 111 includes database 112. Database 112 may store employee data, such as employee records, which may be updated and/or retrieved over network 160. For example, on a periodic basis, information may be extracted from database 112 and/or database 112 may store data received over network 160. Although one database server is shown in FIG. 1, one of ordinary skill in the art will appreciate that one or more database servers may store data used by implementions of the present invention.

Web server 120 may provide a firewall and security for data stored by database server 111 and/or application server 110. Furthermore, web server 120 may communicate between terminals 130-150 and application server 110. For example, web server 120 may provide a web portal for accessing the employee performance evaluation tool and may receive and authenticate user credentials (i.e., user name and password) prior to providing access to the tool.

Terminals 130-150 may be any type device for communicating with web server 120 and/or application server 110 over network 160. For example, terminals 130 150 may be personal computers, handheld devices, or any other appropriate computing platform or device capable of exchanging data with network 160. Terminals 130-150 may each include a processor and a memory (not shown), for example.

Further, terminals 130-150 may execute program modules that provide one or more graphical user interfaces (GUIs) for interacting with network resources. Users may access data through a web browser or software application running on any one of terminals 130-150. For example, as discussed above, a web portal may include options for allowing a user to log onto a secure site provided by web server 120 by supplying credentials, such as a username and a password. Once logged onto the site, the web portal may display a series of screens prompting the user to make various selections to execute an employee performance evaluation tool, discussed below in further detail. The employee performance evaluation tool may be stored as one or more program modules in memory 114 of application server 110, for example. Further, since some disclosed embodiments may be implemented using an HTTPS (hypertext transfer protocol secure) environment, data transfer over a network, such as the Internet, may be done in a secure fashion.

In an alternative implementation, any one of terminals 130-150 may execute the program that provides the employee performance evaluation tool. For example, the program that provides the employee performance evaluation tool may be stored in a memory (not shown) of one or more of terminals 130-150.

In operation, the employee performance evaluation tool may provide a user with the ability to submit data and participate in an evaluation process. For example, once an employee using terminal 130 accesses a website, the employee may enter objectives. Objectives are discussed in more detail in relation to FIG. 3. An evaluator at terminal 140 may rate an employee. Rating of an employee by an evaluator is discussed in more detail in connection with FIG. 5. Further, once the evaluator has completed rating an employee, application server 120 may access data stored in database 112 and, using predetermined weights, calculate an overall numeric rating for an employee. Web server 120 may then transmit a notification e-mail when the rating has been completed so that a higher-level evaluator may review the rating. For example, a higher-level evaluator using terminal 150 may review and either approve or modify the rating. Once the rating has been approved, web server 120 may transmit a notification e-mail to the employee and the evaluator.

Figure 2:
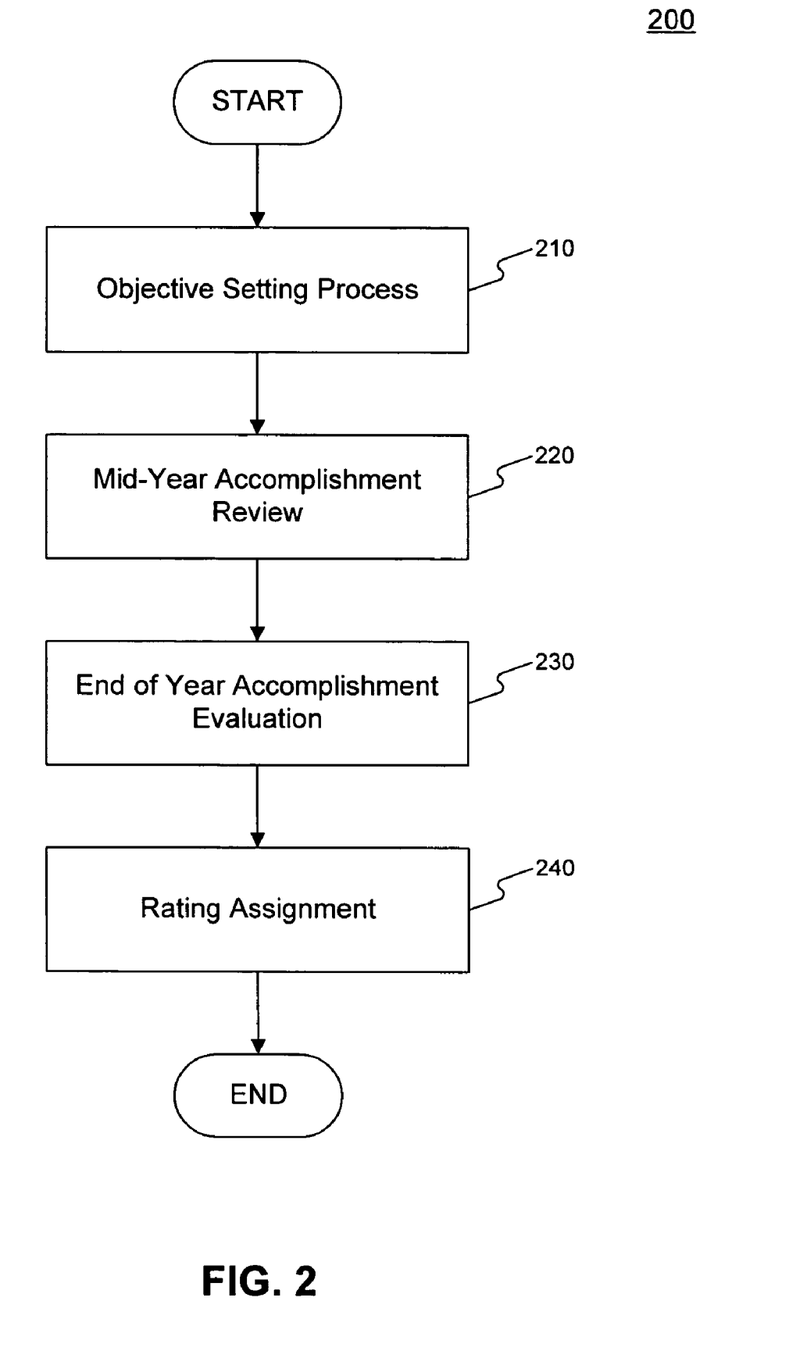
FIG. 2 is a flow diagram showing an exemplary overview of a performance evaluation process, consistent with the present invention.

FIG. 2 is a flow diagram 200 showing an overview of a performance evaluation process. The process may be used by an organization so that an employee may establish performance expectations and obtain feedback on individual and organizational performance during the course of an evaluation period. The objective setting process allows an employee to concentrate on objectives within his or her line of sight that will drive performance.

In step 210, employees may establish objectives based upon targeted achievements for the organization or a unit of the organization. These "core requirements" provide line of sign for an individual's contributions toward raising an organization's performance. In the objective setting process, the employee identifies individual opportunities for improving and stretching specific performance areas in order to drive unit performance up. The employee also may identify the system(s) that will be used to track his/her individual performance and confer with the evaluator to determine and document specific targets at the contributor, high contributor, and exceptional contributor levels. Furthermore, some core requirements may be predefined and required due to the employee's position and/or pay package. Further, the employee may select some core requirements from a drop-down list of pre-approved objectives, for example, or may enter narrative core requirements. For narrative core requirements, the employee defines the requirement, writes a description, identifies the trackable system that will be used to document performance, and confers with the evaluator to determine and document specific targets at the contributor, high contributor, and exceptional contributor levels.

In one embodiment, the core requirements include one or more of individual objectives and core performance dimensions or behavioral objectives. Individual objectives may be selected from drop down lists of pre-approved objectives, which may be stored in the PES, or may be narrative. Core performance dimension and behavioral objectives may be predetermined and also stored in the PES. Furthermore, for some positions, an employee's core requirements may include individual narrative objectives and core performance dimensions. Core requirements for other employees may include individual objectives and behavioral objectives. Still other employees have only behavioral objectives as their only core requirements. These distinctions in core requirements are based on employee classifications.

Narrative core requirements are measurable and trackable through an identified data source or system, discussed and agreed upon between an employee and his/her evaluator during the objective-setting discussion, and entered into PES. Pre-determined core requirements are measurable and trackable through an identified data source, established at the beginning of the year by an organization or department, and made available to employees/evaluators for review during the objective-setting process, and selected from a drop-down menu in PES according to function and job title.

Further, some positions may have the option to choose "Other" as one of their pre-determined measurable core requirements (accessed through a drop-down menu in PES). If "Other" is chosen, the employee is prompted to enter a narrative description, targets at the contributor, high contributor, and exceptional contributor levels of performance, and a trackable system into the PES. All types of core requirements are measurable and defined by performance indicators, trackable systems used to verify achieved performance, and target outcomes that measure achieved performance at the contributor, high contributor, and exceptional contributor levels of performance. A performance indicator" is an established measure that is documented at the beginning of the year. A "trackable system" is used to demonstrate achieved performance against target outcome. A "target outcome" refers to a defined score or target defined in the objective setting process at each level of performance that will be used to measure the employee's achieved performance.

Pre-determined behavioral core requirements are developed with pre-determined performance expectations and targets (numerical targets and trackable systems are not set for behavioral core requirements), established at the beginning of the year by a department and made available to employees/ evaluators for review during the objective-setting process, and already populated on the user's screen in PES to show performance expectations and targets.

As an example, a particular employee may be rated on one behavioral objective as one of their core requirements. For example, the behavior objective may be an "oral communication" core requirement. Another employee may be rated on two pre-determined behavioral objects, such as a "leadership and communication" core requirement and a "fiscal management" core requirement. Still other employees may be rated using a different combination. For example, an employee's core requirements may include four components. During the objective-setting process, evaluators and employees may select all or some of these components on which to evaluate the employee. As an example, four components may include a "problem solving" core requirement, a "planning and organizing" core requirement, a "customer focus" core requirement, and a communication core requirement.

When defining core requirements, employees may look to goals that have been defined by an evaluator when formulating targets for the evaluation period. As a leader of a unit, an evaluator also needs to plan what he or she wants the unit to accomplish, deliver, and/or improve. Evaluators must determine what they hope their units achieve by the end of the year; describe how the unit will contribute to organizational success; define strategies to achieve those desired outcomes; and direct the team where to focus for the fiscal year.

Through an interactive discussion, an evaluator and employee may determine which core requirements will be used to track the employee's performance for the year. These core requirements should be selected based on the employee's line-of-sight or influence in the organization. The evaluator and employee discuss these core requirements in order to clarify trackable systems and targets and come to a mutual understanding on what goals the employee should target for the year. Employees may submit the agreed-upon core requirements with measures and targets for formal approval through PES. During this discussion, the employee and evaluator come to an agreement as to how to track results for the core requirements defined during the objective setting process. For example, the employee and evaluator determine what targets constitute levels of achievement and whether or not an employee has met certain goals. The employee and evaluator also determine the trackable system that will be used to document the employees performance against these targets. These descriptions are saved in PES and are available to both the employee and the evaluator at a later time so that the evaluator may determine whether or not the employee met a goal. If the employee has accurately documented the objectives and targets discussed, the evaluator approves them via PES. If the evaluator feels that the employee needs to revise or complete additional work, the evaluator returns the pending core requirements to the employee with instructions regarding what revisions or additional work is needed.

Furthermore, when the employee confirms his or her own profile (i.e., job title and reporting structure), the employee may also be required to indicate an individual that will be responsible for evaluating the employee. The evaluator may then accept or reject his or her assignment as an evaluator of a particular employee. In the event that an evaluator assumes a new job role or assignment, functionality may allow for a designation and approval of a new evaluator. The process then proceeds to step 220.

In step 220, a mid-year accomplishments review phase may occur or a review phase may occur at any predetermined fraction of an overall review time period. Accordingly, any suitable time period may be used. In this step, employees document accomplishments in PES and provide specific examples of achievements toward the targets they set at the beginning of the year. Employees submit this information to their evaluators via PES. During this step, evaluators may review the employee's accomplishments in PES. At this time, an evaluator also reviews any unit and organization objective performance indicators that the employee is being evaluated against. An evaluator should review all of this information prior to holding a mid-year performance review discussion with the employee. The evaluator then conducts a mid-year performance review discussion with the employee. Evaluators compare actual results based on desired targets and provide feedback concerning the employee's performance, specifically addressing the employee's objective performance indicators and/or core requirements. Evaluators then use the PES to enter the date that these discussions took place. Evaluators may also add comments for any of the employee's accomplishments or in general in the PES.

Turning to step 230, an end-of-year accomplishments evaluation phase may follow. Such a phase may occur at the conclusion of any predetermined time period (e.g., at the conclusion of six months, a year, etc.). During the end-of-year accomplishments evaluation phase, employees document accomplishments in PES. Employees provide specific examples of achievements toward the targets of the core requirements they set at the beginning of the year. Employees submit this information to their evaluators via the PES. The evaluator may review the employee's accomplishments in PES. At this time, an evaluator also reviews any unit and organization objective performance indicators that the employee is being evaluated against. An evaluator should review all of this information prior to holding an end-of-year performance review discussion with the employee. The evaluator then conducts an end-of-year performance evaluation discussion with the employee. The evaluator provides feedback concerning the employee's performance comparing actual results with agreed-upon targets, specifically addressing the employee's unit and organization objective performance indicators and/or core requirements. The evaluator then uses the PES to enter the date that this discussion took place.

Next, in step 240, a rating assignment phase completes the process. In the rating assignment phase, evaluators enter an end-of-year core requirements rating for the employees. An evaluator uses the PES to assign a recommended core requirements rating based on an employee's actual performance against agreed-upon targets. The PES then calculates these recommended core requirements ratings with the unit and organization score. The calculation of these ratings is the employee's "overall performance rating," which is then submitted for higher-level concurrence (when required). For example, after this step has occurred, higher-level evaluators may be required to provide concurrence on overall performance ratings. The next higher-level evaluator accesses the PES to review and approve (in cases where required) the overall performance rating recommended for the employee. Only after this rating is approved by this higher-level evaluator is the employee advised of his or her overall performance rating.

Figure 3:
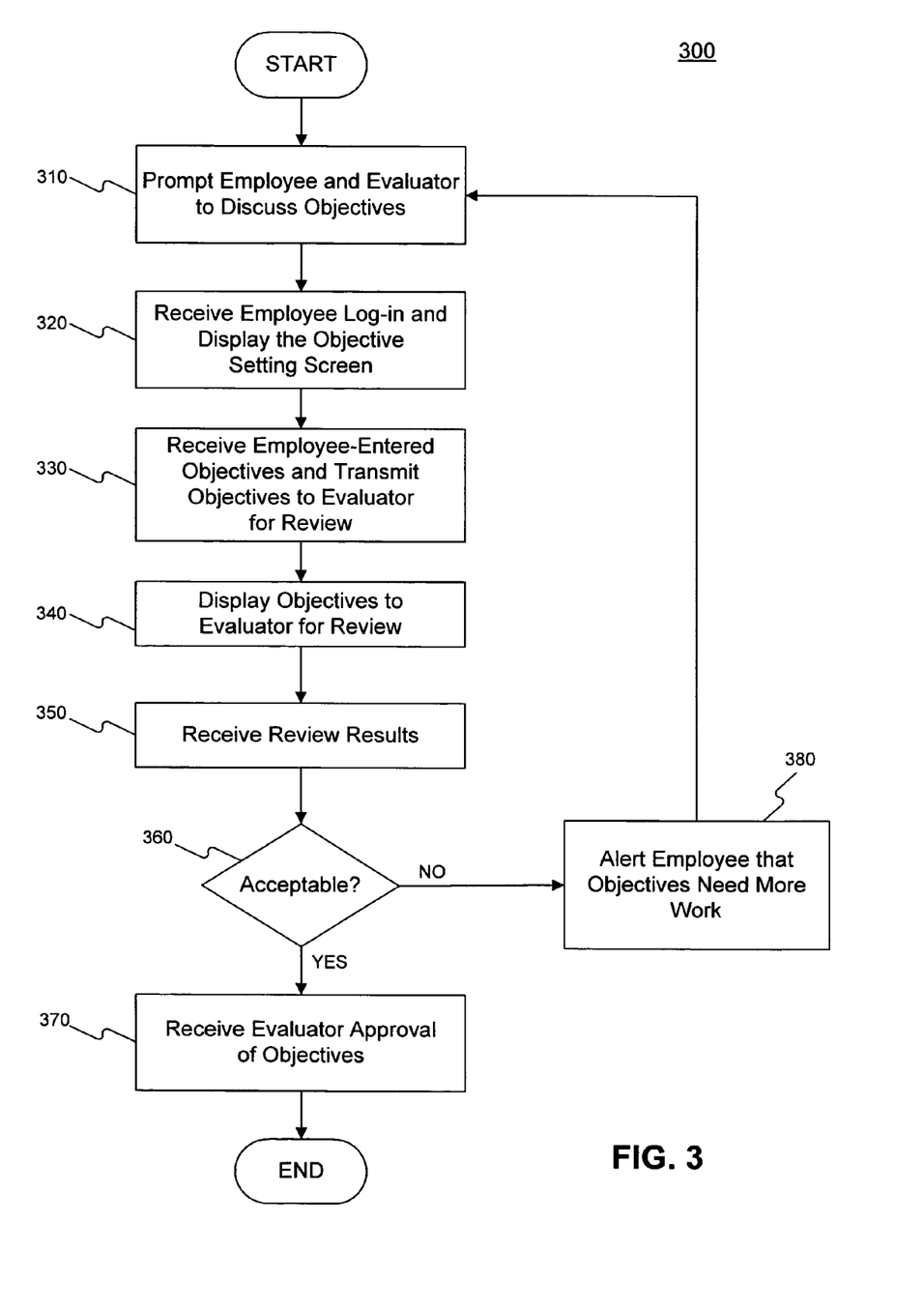
FIG. 3 is a flow diagram of an exemplary overview of an objective setting process, consistent with the present invention.

FIG. 3 is a flow diagram 300 of an overview of an objective setting process, consistent with the present invention. The process may be scheduled to occur annually, or periodically through the year, so that an employee and evaluator may establish objectives for the employee for a particular time period.

In step 310, individual core requirements are determined through an interactive discussion between the employee and the evaluator at the beginning of the evaluation period. The employee and/or evaluator may receive a prompt indicating that it is time to schedule a meeting for a given evaluation period. The prompt may be transmitted, for example, as an automatic e-mail notification.

The employee is then required to document the individual core requirements, the targets identified at the contributor, high contributor, and exceptional contributor levels of performance, and the trackable systems that will be used to document the employee's performance and forwards them to the evaluator for approval using the PES. Employees detailed, reassigned, promoted, or newly hired to eligible positions must determine individual core requirements within thirty days of assuming the position.

Core requirements may include one or more behavioral objectives that relate to specific job-related behaviors. The evaluated employee demonstrates these behaviors in the course of performing the duties and responsibilities of the position. These behavioral objectives may be developed with pre-determined performance expectations and targets that form the basis upon which to measure an employee's performance. Evaluators must not establish arbitrary targets or measurements to replace or support those that have already been predefined for behavioral objectives.

The behavioral objectives provide an opportunity to emphasize how individual behavior impacts organization and unit indicators in certain key areas. By providing distinctions between the various levels of behavior, employees will be encouraged to adopt those behavioral traits that have a positive impact on the working environment, customer and employee relationships, and the overall financial integrity of the unit.

In step 320, the employee logs into the PES and accesses an objective setting screen. The objective setting screen may be provided, for example, as a graphical user interface (GUI) appearing on a display. Further, the objective setting screen may be accessed via an Internet website. An Internet website may prompt the employee to provide a user name and password in order to access the objective setting screen. Upon verification of the supplied credentials, the website may grant the employee access to a menu from which the objective setting screen may be selected.

Next, in step 330, the employee enters objectives into the objective setting screen. This step may involve the employee completing online forms available at the website, for example. An employee may save his or her objectives and return to the website at a later time to review and/or modify them. The objectives may be stored to database 112 of database server 111, for example, as described in connection with FIG. 1. Once an employee has completed entering objectives, the employee may submit the objectives to the employee's evaluator for review. Submitting the objectives may result in a e-mail or other notification being transmitted to the evaluator.

After being alerted that an employee assigned to the evaluator has completed the objectives, the evaluator may access the website, for example, and review the objectives that the employee entered. The website may display the objectives on a display. The evaluator may also have the option of printing the objectives, saving them locally, or requesting that the objectives be prepared in a report form, such as in a PDF (portable document format) document.

In step 350, once the evaluator has reviewed the objectives, the evaluator may approve or return the objectives to the employee for further work. The objectives may be stored by database server 111. The process proceeds to step 360.

In step 360, using application logic, application server 110 may receive a response from the evaluator indicating whether the objectives are acceptable or not. If the objectives are accepted by the evaluator, the process continues to step 370. If the objectives are not acceptable, then the process proceeds to step 380.

When the objectives are not accepted by the evaluator, in step 380, an e-mail is sent to the employee to alert him or her that the objectives require more work. The e-mail may be sent, for example, from application server 110. Further, the evaluator may provide feedback and guidance, such as written comments, to indicate how the objectives may be improved. The process then returns to step 310, where the employee and evaluator may discuss ways of improving or further define the core requirements, the trackable systems, and/or targets that define levels of performance. When the objectives are determined by the evaluator to be acceptable, the evaluator may make a selection indicating that the objectives have been approved. An e-mail notification or other notification may be sent to the employee to notify the employee that the process has concluded. The objectives are then stored to database server 111, for example.

Figure 4:
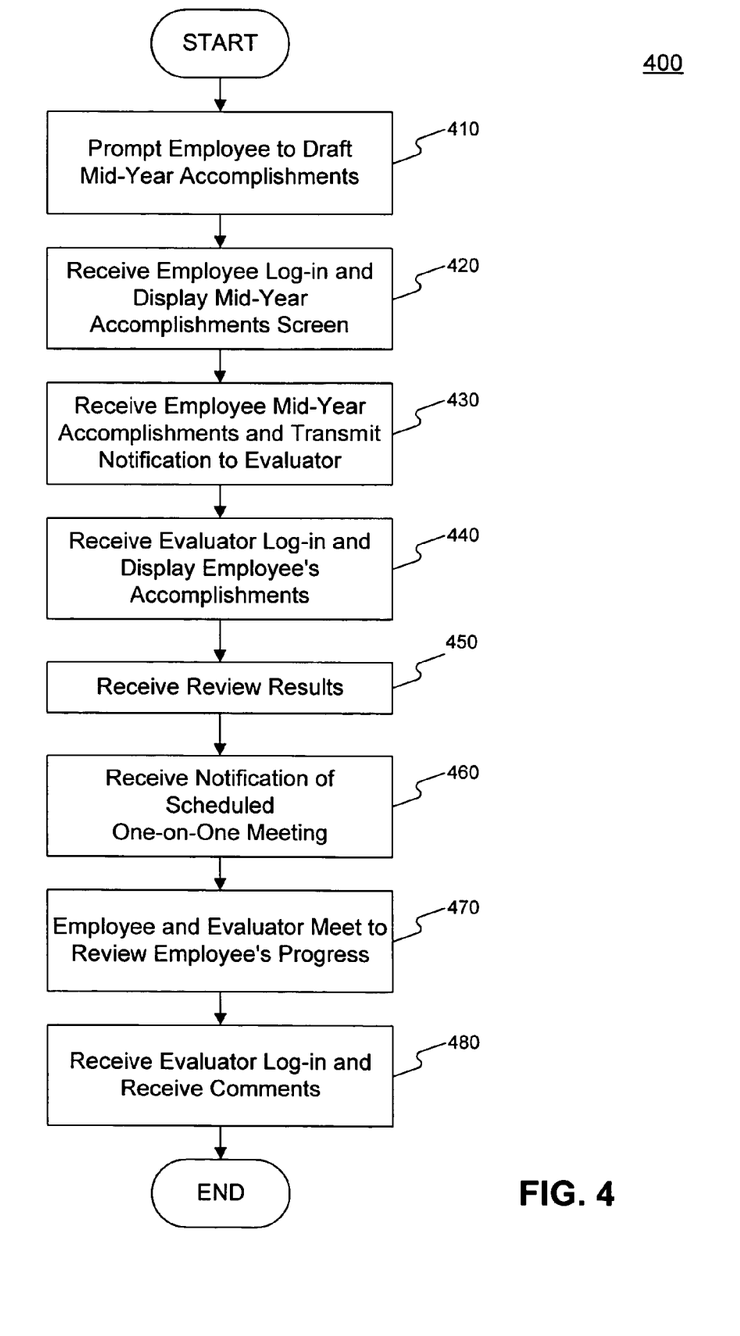
FIG. 4 is a flow diagram of an exemplary overview of a mid-year accomplishments process, consistent with the present invention.

Referring now to FIG. 4, a flow diagram 400 is provided of an overview of a mid-year accomplishments process, consistent with an embodiment of the present invention. Consistent with other embodiments of the present invention, the same process may be used at end of year evaluations as well.

In step 410, an employee is prompted to draft mid-year accomplishments. The prompt may be transmitted as an e-mail notification, for example. The actual drafting of mid-year accomplishments may be done with or without the aid of computing resources. Next, in step 420, the employee logs into PES and a mid-year accomplishments screen may be displayed. The mid-year accomplishments screen may be accessed and displayed in a manner similar to that discussed above with respect to FIG. 3. For example, the employee may log into a website and select a mid-year accomplishments icon or screen.

Once at the mid-year accomplishments screen, in step 430, the employee enters his or her mid-year accomplishments. This may include submitting a summary description of specific examples of achievements against targets or completing a series of screens that prompt the employee to enter information. Further, the evaluator may return the employee's accomplishments for further description or documentation. The summary may be saved to database server 111, for example. Once the employee has completed entry of his or her mid-year accomplishments, an automatic e-mail message may be generated and transmitted to the employee's evaluator notifying the evaluator that the employee has submitted his or her mid-year accomplishments.

In step 440, the evaluator may log into the PES and review the employee's accomplishments. Further, the evaluator may review the unit and organization objective performance indicators that the employee is being evaluated against. Functionality may be provided so that the evaluator may generate comments, for example, as the evaluator reviews the mid-year accomplishments submitted by the employee. Next, turning to step 450, the review results may be received and stored to database server 111, for example. The evaluator may next schedule a one-on-one meeting with the employee, and a confirmation of the scheduled meeting may be transmitted, for example, via e-mail, in step 460. In step 470, the evaluator and employee meet to review the employee's progress. After the meeting, in step 470, the evaluator logs into the PES and records comments regarding the employee's performance. The evaluator's comments may be saved to database server 111, for example. Further, the evaluator may decide to accept or return the accomplishments to the employee for further work.

As indicated, the above process described with respect to FIG. 4 may be repeated at the end of a year as well. For an end of the year evaluation, the same steps described with respect to FIG. 4 may occur so that an employee may enter annual accomplishments and meet with an evaluator. One of ordinary skill in the art will appreciate that the time periods for holding an evaluation may vary.

Figure 5:
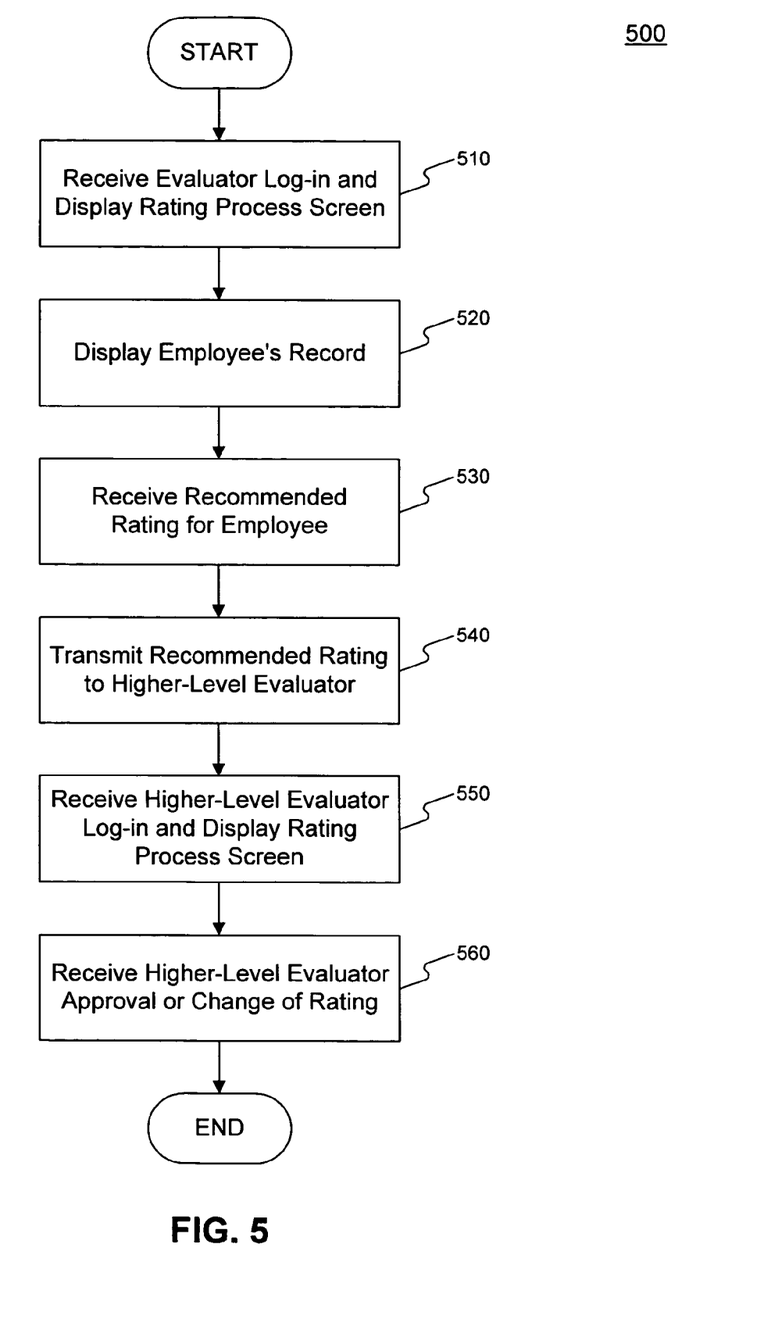
FIG. 5 is a flow diagram of an exemplary overview of a rating process, consistent with the present invention.

FIG. 5 is a flow diagram 500 of an overview of a rating process, consistent with the present invention. After a mid-year or end-of-year evaluation, an evaluator may rate an employee based upon the employee's performance against the targets established in the objective-setting process.

In step 510, the evaluator logs into the PES and accesses a rating process screen. The rating process screen may be accessed, for example, by the evaluator logging into a website with a user name and password. Once the evaluator has accessed the website, the evaluator may select one of the employees to rate that the evaluator supervises. The record of that employee is displayed, as shown in step 520.

In step 530, the evaluator enters and saves a recommended rating for the employee for each core requirement category. Different ratings may be given depending upon an employee's performance. In addition, for behavioral objective categories, the evaluator may rate the employee based on contributor, high contributor, and exceptional contributor performance levels.

A contributor level rating for a specific behavioral objective may indicate that an employee generally states ideas and instructions clearly and concisely, gives attention to what others are saying and takes the time to understand points that are being made, uses appropriate tone and attitude when communicating with others, provides a satisfactory managerial example while motivating employees to work towards departmental goals and objectives, provides practical direction to employees and communicates the department's shared vision. The employee is available to help the team accomplishes its goals, assesses individual strengths and weaknesses and suggests methods for improvement, and supports the organizations mandate through support of its goals and values.

A high contributor level rating for that same specific behavioral objective may indicate that an employee generally states ideas and instructions clearly and concisely, gives attention to what others are saying and takes the time to understand points that are being made, works to ensure understanding and asks for or provides clarification when needed, uses language, examples, and concepts appropriate to the audience. The employee makes decisions and sets policies on controversial issues and provides innovative direction in resolving problems.

An exceptional contributor level rating for that same behavioral objective may indicate that an employee generally articulates in a wide range of communication situations with all levels of the organization, consistently states ideas and instructions clearly and concisely, gives attention to what others are saying and takes the time to understand points that are being made, and works to ensure understanding and asks for or provides clarification when needed. The employee uses language, examples, and concepts appropriate to the audience, provides exceptional leadership in planning organizing, maintaining, controlling and maximizing operations, and extends the opportunity for growth and development to all staff.

Other employees may be rated based on a leadership and communication behavioral objective. A non-contributor level may indicate an employee has difficulty in guiding staff in a positive manner, is inconsistent in providing a satisfactory managerial example while motivating employees to work toward goals and objectives, and is occasionally inflexible when managing changing conditions in the organization.

A contributor level for a leadership and communication behavioral objective may indicate an employee provides a satisfactory managerial example while motivating employees to work toward the post office's goals and objectives, provides practical direction to employees and clearly communicates the post office's shared vision, and is flexible when dealing with and managing changing conditions in the organization. The employee is consistently available to help the team to accomplish their goals, assesses individuals' strengths and weaknesses and suggests methods for improvement, and supports the organization's mandate through support of its goals and values.

A high contributor level for a leadership and communication behavioral objective may indicate that an employee makes decisions and sets policy on controversial issues and provides innovative direction in resolving problems. An exceptional contributor level for a leadership and communication behavioral objective may indicate that an employee provides exceptional leadership in planning, organizing, maintaining, controlling and maximizing operations. The employee also extends the opportunity for growth and development to all staff.

As another example, a fiscal management behavioral objective may be rated. An employee in the non-contributor level for a fiscal management behavioral objective may be inconsistent in using resources efficiently to accomplish organizational goals and in using or shifting resources to meet objectives. The employee may maintain less than acceptable fiscal responsibility while seeking ways to reduce costs.

In a contributor level of a fiscal management behavioral objective, an employee makes effective use of available resources (employee's time and materials) to accomplish organizational goals, maintains fiscal responsibility while seeking for ways to reduce cost, and consistently uses and allocates resources to meet objectives. In a high contributor level of a fiscal management behavioral objective, an employee may often gain greater use of available resources than expected. In an exceptional contributor level of a fiscal management behavioral objective, an employee may frequently and effectively use limited resources to gain maximum results. The employee may also be highly innovative and successful in identifying alternative resources to accomplish objectives.

For core requirements, the evaluator bases his or her rating on whether or not the employee achieved targets as agreed upon and documented during the objective setting process.

Once the evaluator has completed entering ratings for all core requirements as applicable to an employee's category, the evaluator submits the rating as a recommendation to a higher-level evaluator. A notification of the recommended rating may be transmitted to the higher-level evaluator, as shown in step 540. For example, the higher-level evaluator may receive an e-mail or other notification that the rating has been completed. In step 550, the higher-level evaluator logs into the PES and accesses a rating process screen, which displays the rating. In step 560, the higher-level evaluator either approves or changes the rating. A result of the higher-level evaluator's approval or change is then saved to database server 111, for example.

Once all ratings have been formalized, an employee may receive notification of the rating, as well as an indication of any pay raise and/or bonus. An employee, who believes the overall performance rating does not substantively reflect a fair assessment of his/her contribution to the work unit may separately document the concerns and rationale and submit the documentation to the evaluator. The employee then requests a follow-up discussion with the evaluator. If no agreement on the overall performance rating is reached during this follow-up discussion, the employee may request a review by the next higher-level evaluator. The next higher level evaluator reviews the employee's documented concerns and rationale and makes a final determination.

With regard to the assignment of core requirements ratings, evaluators may assign ratings based on the following matrix, which is shown as Table 1, depending on employee category.

TABLE 1

Contribution Levels Under the 15-Point Matrix

| Non-Contributor | Contributor | High Contributor | Exceptional Contributor |
|---|---|---|---|
| 3 | 6 | 9 | 12 | 15 |
| 2 | 5 | 8 | 11 | 14 |
| 1 | 4 | 7 | 10 | 13 |

To determine an employee's overall performance rating, the aggregate results of the evaluation process, including core requirements ratings and organization/unit scores, are calculated to determine one overall numeric rating. To arrive at the overall numeric rating, a weighted average may be computed of the core requirements ratings and scores for the organization/unit indicators. For example, depending upon an employee's position in the organization, the weight assigned to each of the core requirements ratings and organization/unit indicators may differ. The following example illustrates how this calculation process is carried out.

An employee established two core requirements at the beginning of the year. He or she is measured on organization/unit indicators (e.g., via NPA). At the end of the year, the employee receives a composite summary of 8.25 (via NPA) based on a weighted calculation for both the unit and organization scores. At the end of the year, the employee receives two core requirements ratings, one of a 6 and one of an 11 (via the PES). A weight of 70% is applied to the organization/unit indicators to arrive at a weighted score. A weight of 15% is applied to each of the core requirements ratings. One of skill in the art will appreciate that any appropriate weighted combination may be used. Adding each of the weighted scores together results in the overall numeric score, which may be rounded to the nearest whole number. Table 3 provides further details describing this example.

TABLE 2

Exemplary Ratings, Weights, and Scores

| Indicator | Rating Value | Weight | Score |
|---|---|---|---|
| Composite Summary (NPA) | 8.25 | 70% | 5.78 |
| Core Requirements Rating (PES) | 6 | 15% | 0.90 |
| | 11 | 15% | 1.65 |
| Overall Performance Rating | | | 8.33 |
| | | | Rounded to nearest whole number = 8 |

An employee's overall performance rating is used to determine the level of compensation payable, based on a matrix, such as 15-point matrix. All percentages are paid as salary increases if there is room within the employee's salary structure. If the employee's award amount is limited by his or her salary structure, then the award will be converted to a lump sum payment. An exemplary 15-point matrix is shown below in Table 4.

TABLE 3

Overall Performance Ratings/Salary Increases Under the 15-Point Matrix

| Non-Contributor | | Contributor | | High Contributor | | Exceptional Contributor | |
|---|---|---|---|---|---|---|---|
| 3 | 0.0% | 6 | 3.5% | 9 | 6.5% | 12 | 9.5% | 15 | 12.0% |
| 2 | 0.0% | 5 | 3.0% | 8 | 5.75% | 11 | 8.75% | 14 | 11.0% |
| 1 | 0.0% | 4 | 2.5% | 7 | 5.0% | 10 | 8.0% | 13 | 10.25% |

As shown in Table 4, exemplary percentages are assigned to each of the points in the 15-point matrix. For the previous example discussed above, the overall numeric score was 8, and the employee therefore is rated as a "contributor." Further, the employee will be awarded a 5.75% salary increase.

The foregoing descriptions of the invention have been presented for purposes of illustration and description. They are not exhaustive and do not limit the invention to the precise form disclosed. Modifications and variations are possible in light of the above teachings or may be acquired from practicing of the invention. For example, the described implementation includes software, but the present invention may be implemented as a combination of hardware and software or in hardware alone. Additionally, although aspects of the present invention are described as being stored in memory on a server, one skilled in the art will appreciate that these aspects can also be stored on other types of computer-readable media, such as secondary storage devices, like hard disks, floppy disks, or a CD-ROM; a carrier wave from the Internet or other propagation medium; or other forms of RAM or ROM. The scope of the invention is defined by the claims and their equivalents.

Other embodiments of the invention will be apparent to those skilled in the art from consideration of the specification and practice of the invention disclosed herein. The specification and examples should be considered as exemplary only, with a true scope and spirit of the invention being indicated by the following claims.

What is claimed is:

1. A computer-implemented method for evaluating employee performance, the method comprising:

receiving objectives for an employee, the objectives comprising core requirements, established on an individual level, set as goals for the employee for a time period;

receiving, from a database, performance indicators, established on an organizational level, applicable to the employee's position, wherein the performance indicators are based on at least an evaluation of performance at the organization, unit, and individual level;

receiving, by a processor, ratings from an evaluator for the core requirements and the performance indicators; and computing, by the processor, an overall rating, the overall rating being a weighted average of the rated core requirements and the rated performance indicators.

2. The method of claim 1, wherein the core requirements comprise one or more of individual objectives, core performance dimensions, or behavioral objectives.

3. The method of claim 1, wherein a fractional time period accomplishments review phase occurs a predetermined fraction through the time period, the method further comprising:
receiving, from the employee, accomplishments toward the core requirements; and
transmitting the accomplishments to the evaluator; and
transmitting, by the evaluator, an approval of the accomplishments to the employee.

4. The method of claim 3, wherein an end of time period accomplishments review phase occurs at the end of the time period, the method further comprising:
receiving, from the employee, additional accomplishments toward the core requirements;
transmitting the additional accomplishments to the evaluator; and
transmitting, by the evaluator, an approval of the accomplishments to the employee.

5. The method of claim 1, wherein the ratings received from the evaluator for the core requirements are based on an evaluation of the employee's achievements during the time period.

6. The method of claim 1, further comprising:
receiving, from a higher-level evaluator, an approval of the overall rating;
and transmitting a notification of the overall rating to the employee.

7. The method of claim 1, wherein the overall rating is based on a numerical scale and represents one of a non-contributor level, a contributor level, a high contributor level, and an exceptional contributor level.

8. The method of claim 1, further comprising:
determining an increase in compensation based on the overall rating; and
when the employee's salary structure does not provide for the increase, converting the increase into a lump sum payment.

9. A system for evaluating employee performance, the system comprising:
at least one web server; and
an application server including a database, the server operable to:
receive objectives for an employee, the objectives comprising core requirements, established on an individual level, set as goals for an employee for a time period;
receive, from a database, performance indicators, established on an organizational level, applicable to the employee's position, wherein the performance indicators are based on at least an evaluation of performance at the organization, unit, and individual level;
receive ratings from an evaluator for the core requirements and the performance indicators; and
compute an overall rating, the overall rating being a weighted average of the rated core requirements and the rated performance indicators.

10. The system of claim 9, wherein the core requirements comprise one or more of individual objectives, core performance dimensions, or behavioral objectives.

11. The system of claim 9, wherein the server is further operable to conduct a fractional time period accomplishments review phase a predetermined fraction through the time period in which the server:
receives, from the employee, accomplishments toward the core requirements; and
transmits the accomplishments to the evaluator; and
transmitting, by the evaluator, an approval of the accomplishments to the employee.

12. The system of claim 11, wherein the server is further operable to conduct an end of time period accomplishments review phase at the end of the time period in which the server:
receives from the employee end-of-year accomplishments toward the core requirements;
transmits the end-of-year accomplishments to the evaluator; and
transmitting, by the evaluator, an approval of the end-of-year accomplishments to the employee.

13. The system of claim 9, wherein the ratings received from the evaluator for the core requirements are based on an evaluation of the employee's achievements during the time period.

14. The system of claim 9, wherein the server is further operable to:
receive from a higher-level evaluator an approval of the overall rating; and
transmit a notification of the overall rating to the employee.

15. The system of claim 9, wherein the overall rating is based on a numerical scale and represents one of a non-contributor level, a contributor level, a high contributor level, and exceptional contributor level.

16. The system of claim 9, wherein the server is further operable to:
determine an increase in compensation based on the overall rating; and
when the employee's salary structure does not provide for the increase, the server converts the increase into a lump sum payment.

17. A non-transitory computer-readable medium storing program instructions executable by a processor for evaluating employee performance according to a method, the method comprising:
receiving objectives for an employee, the objectives comprising core requirements, established on an individual level, set as goals for an employee for a time period;
receiving, from a database, performance indicators, established on an organizational level, applicable to the employee's position, wherein the performance indicators are based on at least an evaluation of performance at the organization, unit, and individual level;
receiving ratings from an evaluator for the core requirements and the performance indicators; and
computing an overall rating, the overall rating being a weighted average of the rated core requirements and the rated performance indicators.

18. The non-transitory computer-readable medium of claim 17, wherein the core requirements comprise one or more of individual objectives, core performance dimensions, or behavioral objectives.

19. The non-transitory computer-readable medium of claim 17, wherein a fractional time period accomplishments review phase occurs a predetermined fraction through the time period in which the method further comprises:
  receiving, from the employee, accomplishments toward the core requirements; and
  transmitting the accomplishments to the evaluator; and
  transmitting, by the evaluator, an approval of the accomplishments to the employee.

20. The non-transitory computer-readable medium of claim 17, wherein an end of time period accomplishments review phase occurs at the end of the time period during which the method further comprises:
  receiving, from the employee, end-of-year accomplishments toward the core requirements;
  transmitting the end-of-year accomplishments to the evaluator; and
  transmitting, by the evaluator, an approval of the end-of-year accomplishments to the employee.

21. The non-transitory computer-readable medium of claim 17, wherein the ratings received from the evaluator for the core requirements are based on an evaluation of the employee's achievements during the time period.

22. The non-transitory computer-readable medium of claim 17, further comprising:
  receiving from a higher-level evaluator an approval of the overall rating;
  and transmitting a notification of the overall rating to the employee.

23. The non-transitory computer-readable medium of claim 17, wherein the overall rating is based on a numerical scale and represents one of a non-contributor level, a contributor level, a high contributor level, and an exceptional contributor level.

24. The non-transitory computer-readable medium of claim 17, further comprising:
  determining an increase in compensation based on the overall rating; and
  when the employee's salary structure does not provide for the increase, converting the increase into a lump sum payment.

* * * * *